United States Patent [19]
Yoshino

[11] Patent Number: 5,852,500
[45] Date of Patent: Dec. 22, 1998

[54] IMAGE COMMUNICATION APPARATUS

[75] Inventor: Motoaki Yoshino, Kawasaki, Japan

[73] Assignee: Canon Kabushiki Kaisha

[21] Appl. No.: 360,120

[22] Filed: Dec. 20, 1994

Related U.S. Application Data

[63] Continuation of Ser. No. 115,127, Sep. 1, 1993, abandoned, which is a continuation of Ser. No. 387,981, Aug. 1, 1989, abandoned.

[30]     Foreign Application Priority Data

Aug. 12, 1988  [JP]  Japan .................................. 63-201209

[51] Int. Cl.⁶ ..................................................... H04N 1/00
[52] U.S. Cl. .......................................... 358/440; 358/400
[58] Field of Search ..................................... 358/400, 402, 358/403, 440; 379/100; H04N 1/00

[56]            References Cited

U.S. PATENT DOCUMENTS

| 4,354,261 | 10/1982 | Hagen et al. ............................... 370/42 |
| 4,646,160 | 2/1987 | Iizuka et al. ............................. 353/402 |
| 4,974,097 | 11/1990 | Kaneko et al. .......................... 358/400 |
| 5,121,221 | 6/1992 | Hamano et al. ......................... 358/426 |

FOREIGN PATENT DOCUMENTS

| A0117871 | 8/1983 | European Pat. Off. . |
| A0244869 | 5/1987 | European Pat. Off. . |
| A2089618 | 8/1981 | United Kingdom . |

OTHER PUBLICATIONS

Review of the Electrical Communication Laboratories, vol. 33, No. 1, Jan. 1985, pp. 21–30 (Arisawa et al.).
IEEE Global Communications Conference, Nov. 1984, pp. 303–307 Fujiwara et al.).
Pat. Abs. Jp., vol. 12, No. 215 (E623) Jun. 18, 1988 (JP–A–63010874).

*Primary Examiner*—Thomas L. Stoll
*Attorney, Agent, or Firm*—Fitzpatrick, Cella Harper & Scinto

[57]            ABSTRACT

An image communication apparatus includes a multi-address call unit, having a plurality of multi-address call modes including at least a first multi-address call mode and a second multi-address call mode, for transmitting image data to a plurality of destinations, a console/display unit for setting a proper multi-address call mode of the multi-address call unit, and a main control unit for controlling multi-address transmission in accordance with the proper multi-address call mode set by the console/display unit.

14 Claims, 8 Drawing Sheets

FIG. 1

FIG.2A
F. ASSIGN

| 7 | 6 | 5 | 4 | 3 | 2 | 1 | 0 |
|---|---|---|---|---|---|---|---|
| 15 | 14 | 13 | 12 | 11 | 10 | 9 | 8 |

FIG.2B
R. REDIAL

FIG.2C
P. DIALQ

FIG.2D
R. DIALQ 0
1
2
⋮
15
16

F. ASSIGN

| 0 | 0 | 1 | 1 | 0 | 0 | 1 | 1 |
|---|---|---|---|---|---|---|---|
| 1 | 1 | 0 | 1 | 0 | 1 | 0 | 0 |

| 0 | 0 | 0 | 0 | 0 | 0 | 0 | 0 |
|---|---|---|---|---|---|---|---|
| 1 | 1 | 0 | 1 | 0 | 1 | 0 | 0 |

FIG.4C

R. DIALQ

| | |
|---|---|
| 0 | 0 |
| 1 | 1 |
| 2 | 4 |
| 3 | 5 |
| 4 | STOP CODE "-1" |
| 5 | "-1" |
| 6 | "-1" |
| 7 | "-1" |
| 8 | "-1" |
| 9 | "-1" |
| 10 | "-1" |
| 11 | "-1" |
| 12 | "-1" |
| 13 | "-1" |
| 14 | "-1" |
| 15 | "-1" |
| 16 | STOP CODE "-1" |

IMAGE COMMUNICATION APPARATUS

This application is a continuation of application Ser. No. 08/115,127 filed Sep. 1, 1993, now abandoned, which is a continuation of Ser. No. 07/387,981 filed Aug. 1, 1989, now abandoned.

BACKGROUND OF THE INVENTION

I. Field of the Invention

The present invention relates to an image communication apparatus and, more particularly, to an image communication apparatus having a multi-address call function.

II. Related Background Art

A conventional facsimile apparatus having a multi-address call function is known, as disclosed in U.S. patent application. Ser. No. 080,093 filed on Jul. 31, 1987 and U.S. patent application. Ser. No. 331,173 filed on Mar. 31, 1989. In order to perform a multi-address call, the following three schemes are available to control selection orders of destinations.

The first scheme is an all-destination multi-address call. All the destinations are sequentially addressed. A disconnected destination during sequential addressing is addressed again later.

The second scheme is a one-destination multi-address call. When each designation is addressed and it is disconnected, it is addressed again without addressing the next destination.

The third scheme is a group multi-address call. The destinations are divided into several groups, and any disconnected destinations are addressed again in units of groups.

The above three schemes are generally specified during the manufacture of facsimile apparatuses in accordance with different delivery destinations.

More specifically, only one multi-address call scheme is set in each conventional facsimile apparatus, and this apparatus can be used within only a corresponding delivery destination.

When a facsimile apparatus employs only one multi-address call scheme, it cannot always perform an efficient multi-address call.

SUMMARY OF THE INVENTION

It is an object of the present invention to eliminate the conventional problem described above and to improve an image communication apparatus.

It is another object of the present invention to provide an image communication apparatus operative in a plurality of multi-address call modes.

It is still another object of the present invention to perform a highly efficient multi-address call by selecting a multi-address call mode suitable for each destination.

It is still another object of the present invention to realize a plurality of multi-address call modes by a single control program.

It is still another object of the present invention to provide an image communication apparatus for selecting a multi-address mode in accordance with the number of multi-address call destinations.

The above and other objects, features, and advantages of the present invention will be apparent from the following detailed description of a preferred embodiment in conjunction with the accompanying drawings.

BRIEF DESCRIPTION OF THE DRAWINGS

FIG. 2, consisting of FIGS. 2A–2D, is a view showing an arrangement of a multi-address call control memory in the embodiment shown in FIG. 1;

FIGS. 3-1, 3-2, and 3-3 are flow charts for explaining multi-address call control in the embodiment shown in FIG. 1;

FIG. 4, consisting of FIGS. 4A–4C, is a view showing a multi-address call sequence in the embodiment shown in FIG. 1;

FIGS. 6-1, 6-2 and 6-3 are views showing a multi-address call pattern obtained when the number of elements of a group is changed.

DETAILED DESCRIPTION OF THE PREFERRED EMBODIMENT:

An image communication apparatus according to an embodiment of the present invention will be exemplified as a facsimile machine having a multi-address call function.

Figure 1:
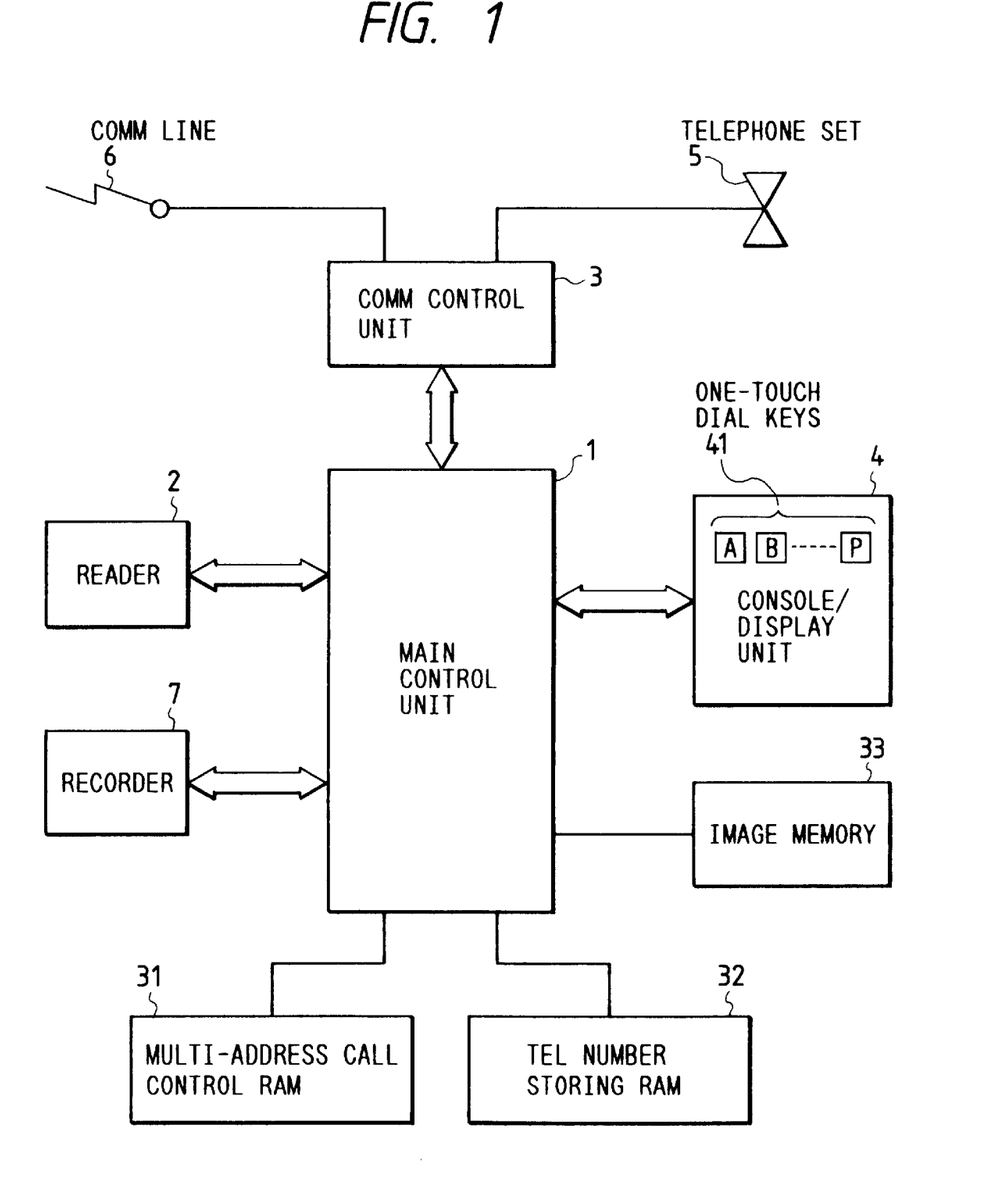
FIG. 1 is a block diagram showing an embodiment of the present invention.
Figure 2A:
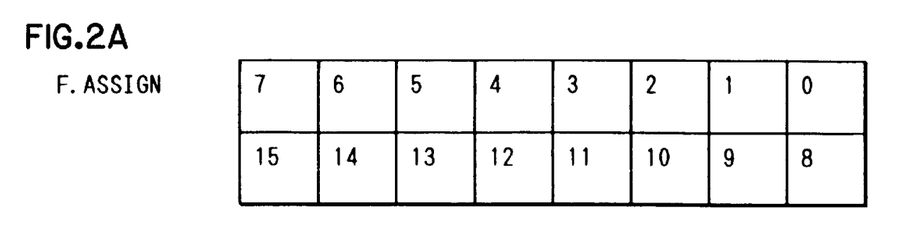
Figure 2B:
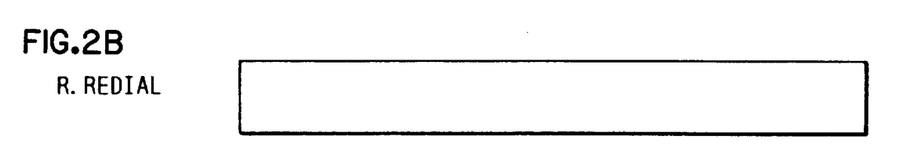
Figure 2C:
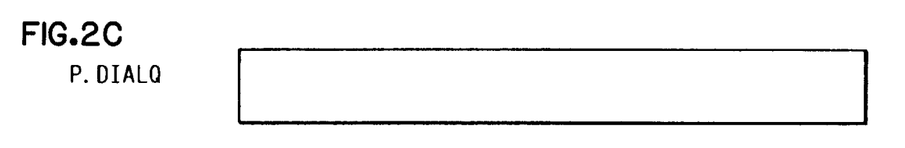
Figure 2D:
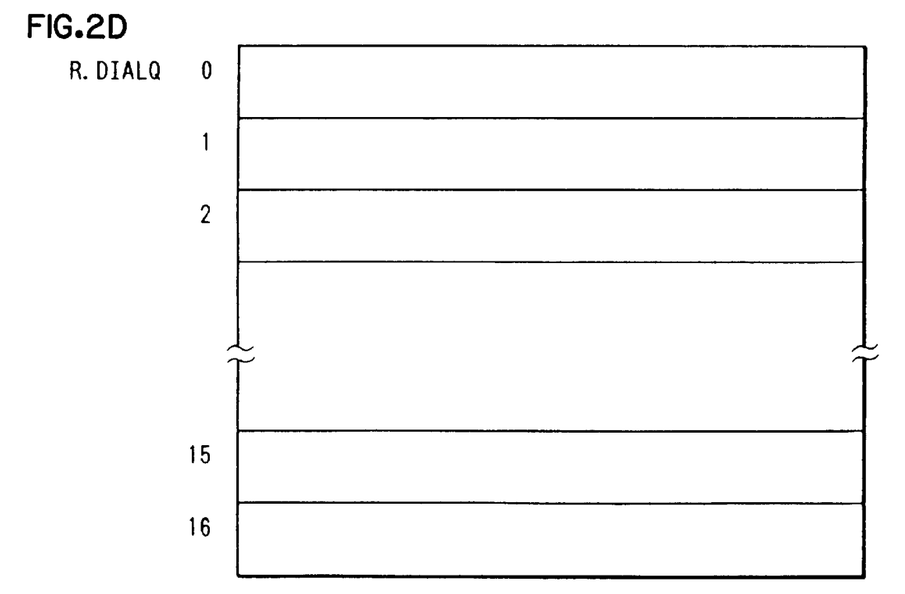

FIG. 1 is a block diagram showing an arrangement of a facsimile apparatus according to the embodiment of the present invention.

Referring to FIG. 1, a main control unit 1 for controlling the overall operation of the facsimile apparatus comprises a microcomputer (CPU), and microcomputer peripheral devices such as a read-only memory (ROM) storing control programs for the (CPU), and a random access memory (RAM) for storing various data.

A reader 2 reads an original image and outputs an image signal to the main control unit 1. The reader 2 comprises a reader used in a conventional facsimile apparatus. In the multi-address call mode, an image read by the reader 2 is encoded (e.g., MH, MR, or MMR coding) by the main control unit 1. The encoded data is stored in an image memory 33.

A communication control unit 3 controls communication of image data. The communication control unit 3 includes a modem, an autodialer, and an NCU (Network Control Unit). When G4 communication complying with the CCITT recommendations is performed through a digital communication line, a G4 communication interface and a communication control unit are arranged in the communication control unit 3.

A console/display unit 4 has functions for allowing an operator to input data and displaying various pieces of information. The console/display unit 4 includes a plurality of key input switches and a display such as an LCD (Liquid Crystal Display). In this embodiment, the console/display unit 4 includes various mode keys for facsimile communication in addition to a ten-key pad including the "0" to "9" keys, the "#" key, the "*" key, a start key, a stop key, and 16 one-touch dial keys 41, i.e., the "A" to "P" keys.

The facsimile apparatus also includes a telephone set 5 and a communication line 6.

A recorder 7 records an image. The recorder 7 comprises, e.g., a thermal printer, an electrophotographic printer, or an ink-jet printer used in a conventional facsimile apparatus.

A multi-address call control RAM 31 is used to control a multi-address call. A telephone (TEL) number storing RAM 32 stores telephone numbers for multi-addressing and one-touch dialing.

The console/display unit 4 serves as a means for designating the number of elements of each group as the number of destinations included in one group. The main control unit 1 performs an all-destination multi-address call if the number of elements of the designated group is the same as the number of multi-address call destinations. If the number of elements of the designated group is one, the one-destination multi-address call is performed. If the number of elements of the designated group is neither one nor the same number of multi-address call destinations, the group multi-address call mode is set.

FIG. 2 is a view showing a structure of the multi-address call control RAM 31 in this embodiment.

In this embodiment, a maximum number of multi-address call destinations is 16. The multi-address call control RAM 31 comprises a flag F.ASSIGN for storing a destination designated by one of the one-touch dial keys 41 on the console/display unit 4 in the form of a bit, a redial control counter register R.REDIAL, a group dial control queue register R.DIALQ, and its pointer P.DIALQ.

Predetermined telephone numbers are registered in the telephone number storing RAM 32 in correspondence with the "A" to "P" one-touch dial keys. This registration is performed in a registration mode.

An operation of this embodiment will be described below.

Figure 31:
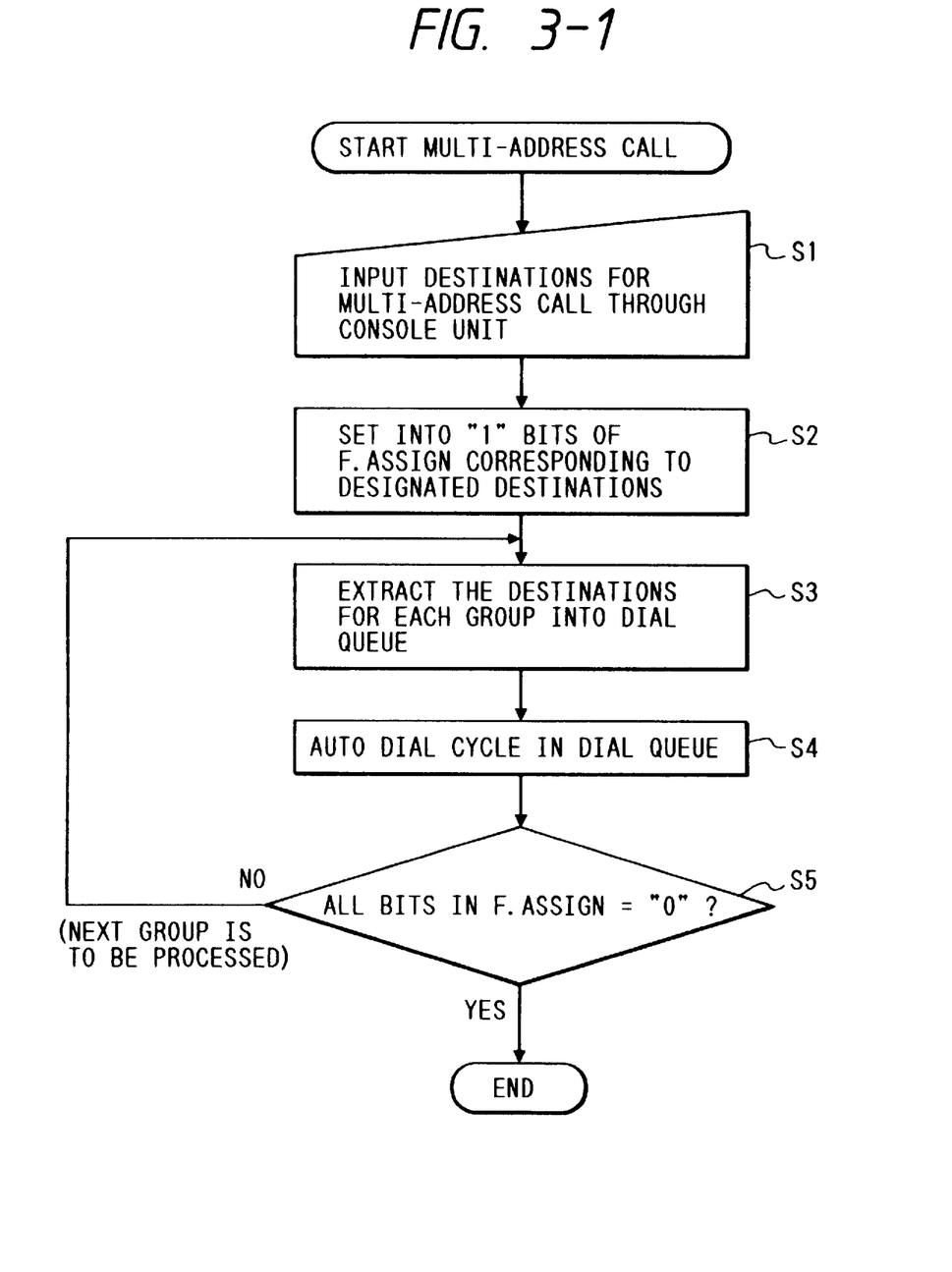

FIG. 3-1 is a flow chart showing control operation of the main control unit 1.

An operator inputs destinations for multi-address call upon continuous depression of the one-touch dial keys 41 in the console/display unit 4 (step S1). Bits corresponding to the destinations designated by the flag F/ASSIGN of the multi-address call control RAM 31 are sequentially set to be "1", and other bits are set to be "0" (step S2).

The multi-address call destinations are divided into a predetermined number of groups, and multi-address call processing is performed in units of groups (steps S3 and S4). When processing for the present group is completed, the main control unit 1 determines in step S5 whether a bit of "1" is still present in the flag F.ASSIGN. If YES in step S5, the flow returns to step S3 to perform processing for the next group. However, if NO in step S5, the control unit 1 determines that multi-address call processing for all the destinations is completed. This processing is thus completed in practice.

In the multi-address call mode, when the destinations are determined, the main control unit 1 reads out the telephone numbers of these destinations from the telephone number storing RAM 32 and outputs the readout telephone numbers to a dialer in the communication control unit 3, thereby performing dialing. When the called destination responds, the multi-address call image data is transmitted from the image memory 33 to the destination in accordance with a facsimile communication protocol. When transmission is ended, the image data is transmitted to the next destination in accordance with the bit state of the flag F.ASSIGN.

In this embodiment, the destinations are divided into groups on the basis of the number of group elements input from the console/display unit 4 by the operator. During group division, when all the destinations are set to belong to one group, the multi-address call scheme is set to be the all-destination multi-address call scheme (first multi-address call mode). However, when all the destinations are grouped into one destination of one group, the multi-address call scheme is set to be the one-destination multi-address call scheme (third multi-address call mode). When all the destinations are grouped into a plurality of groups, the mode is set to be a group multi-address call mode (second multi-address mode).

Figure 32:
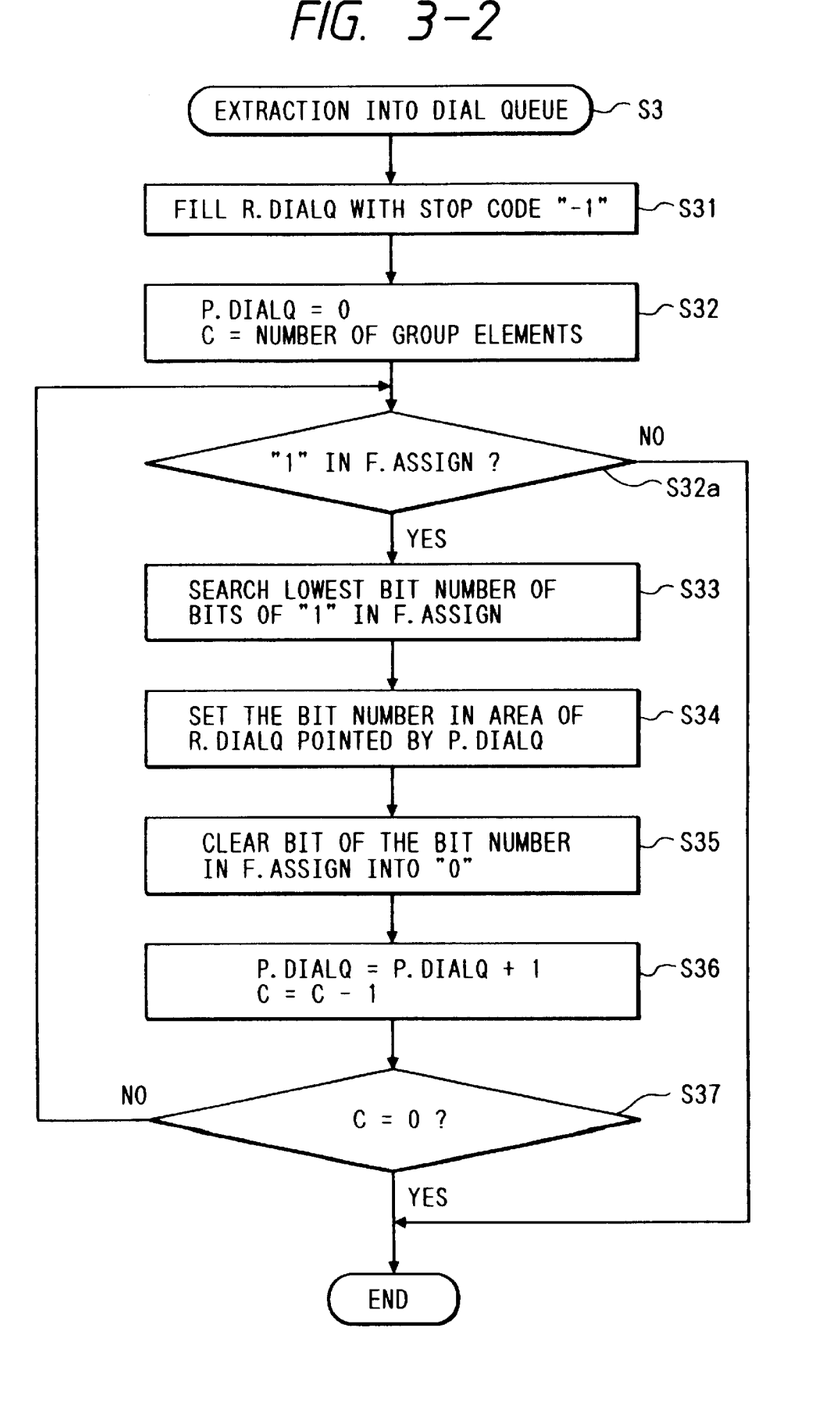

FIG. 3-2 is a flow chart showing a detailed control operation of division into groups and extraction to the dial queue (step S3).

Figure 4A:
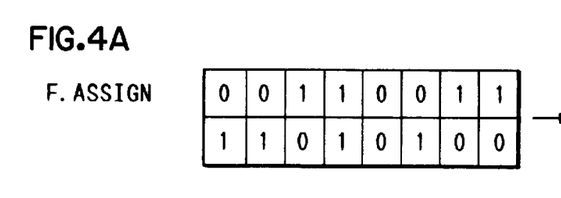
Figure 4B:
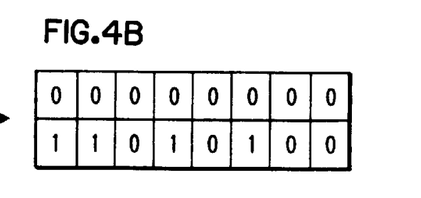
Figure 4C:
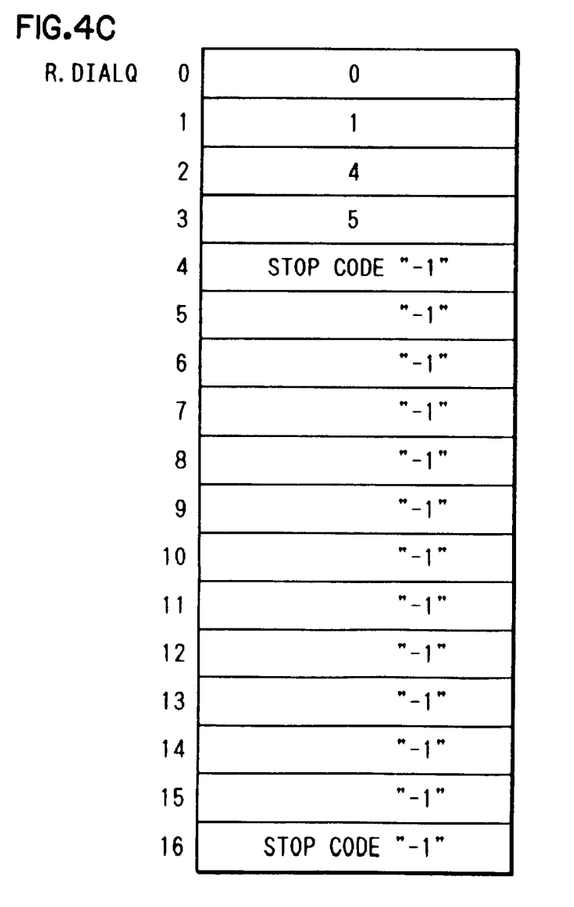
Figure 5A:
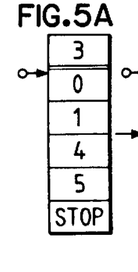
Figure 5B:
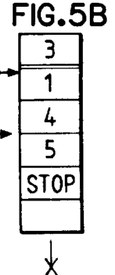
FIG. 5, consisting of FIGS. 5A–5M, is a view showing an AD operation cycle in a dial queue in the embodiment of FIG. 1.
Figures 5C, 5D:
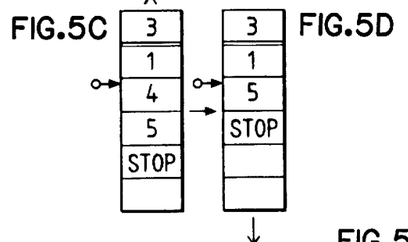
Figure 5E:
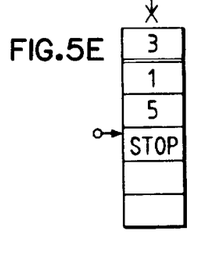
Figures 5F, 5G:
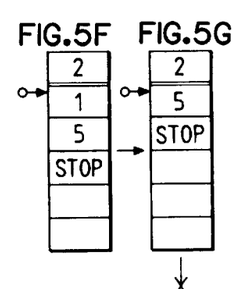
Figure 5H:
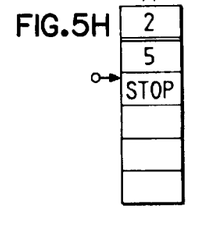
Figure 5I:
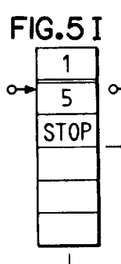
Figure 5J:
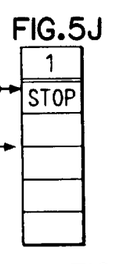
Figure 5K:
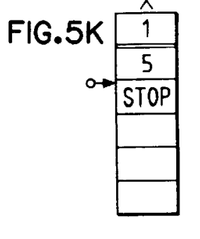
Figure 5L:
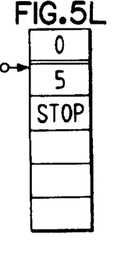
Figure 5M:
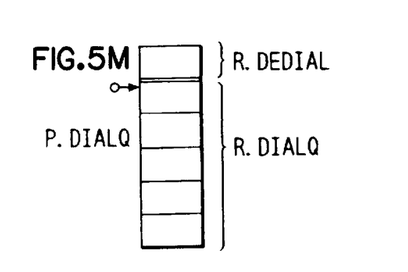

FIG. 4 is a view showing a multi-address call sequence of this embodiment.

Bit data of "1" of the flag F.ASSIGN are transferred to the register R.DIALQ in an order from smaller bit numbers. Upon completion of bit transfer, the corresponding flag F.ASSIGN is set to be "0".

Stop codes "-1" are entirely written in the register R.DIALQ (step S31) to set P.DIALQ =0, and the number C of group elements is set to be C (step S32). The number of group elements is a value input from the console/display unit 4 and represents the number of destinations included in one group. This value is represented by C.

If "1" is set in the flag F.ASSIGN (step S32a), the smallest bit number of the bits of "1" in the flag F.ASSIGN is obtained (step S33) and is set in an area of the register R.DIALQ designated by the pointer P.DIALQ (step S34). The bit of the corresponding bit number of the flag F.ASSIGN is cleared to zero (step S35), and the pointer P.DIALQ is incremented by one, while the number C of group elements is decremented by one (step S36).

If the number C of group elements is not zero (step S37), the flow returns to step S32a. In step S32a, if no bit of "1" is present in the flag F.ASSIGN, the operation is ended. Therefore, one-touch dial numbers of one group are set in the register R.DIALQ.

Figure 33:
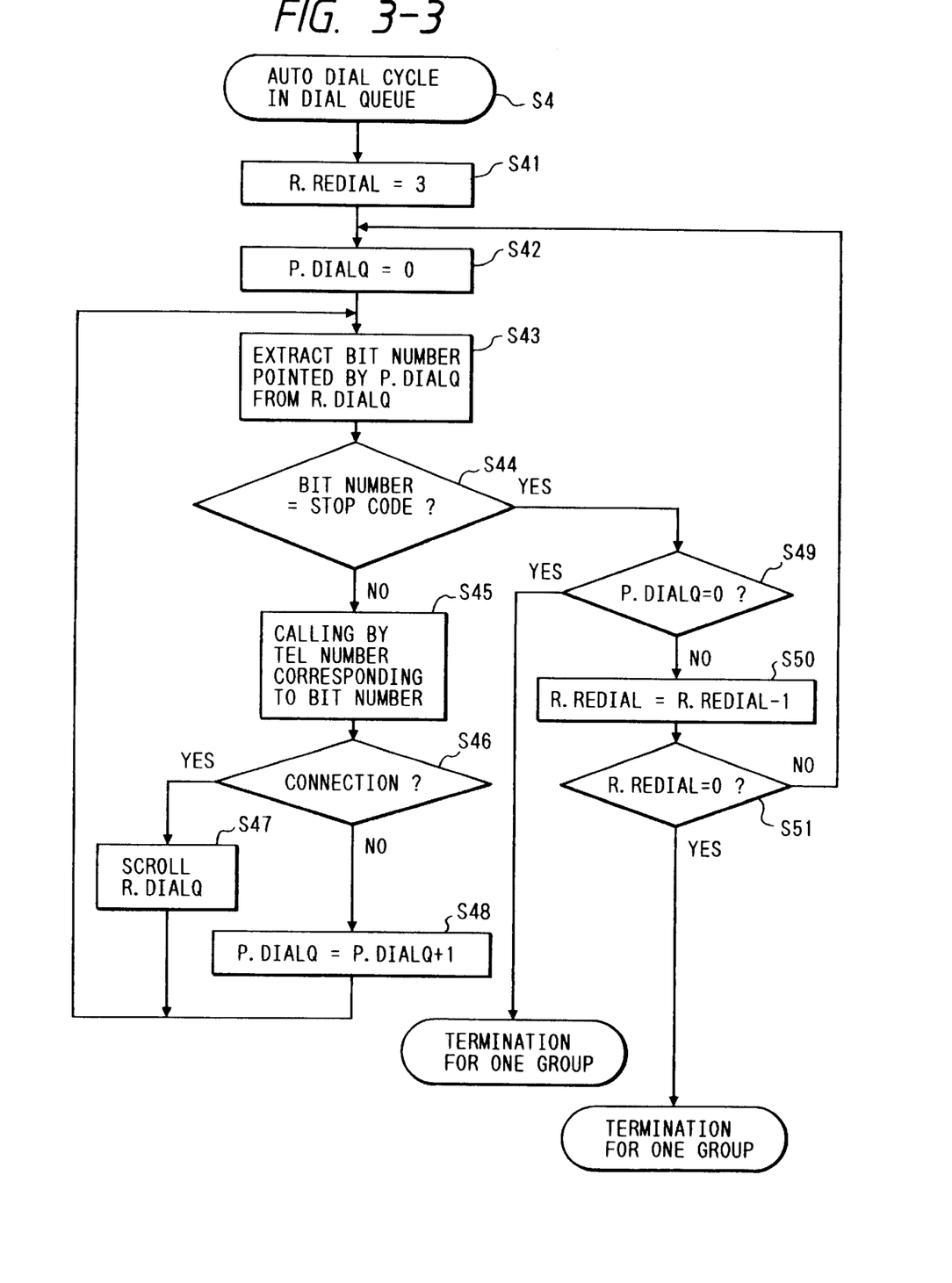

FIG. 3-3 is a flow chart showing a detailed control operation of the AD operation cycle (step S4) in the dial queue.

The bit numbers are sequentially read out from the register R.DIALQ, and the telephone numbers corresponding to these bit numbers are read out from the telephone number storing RAM 32. Dialing is performed using these telephone numbers. This operation is repeated until the number of redialing becomes zero.

If redialing is performed twice, then the register R.REDIAL is set to be 3 (step S41) and the P.DIALQ is reset to zero (step S42). The bit number represented by the pointer P.DIALQ is read out from the register R.DIALQ (step S43). If the bit number does not represent a stop code (step S44), dialing is performed using the telephone number corresponding to this bit number (step S45). If the called destination is connected (step S46), the register R.DIALQ is scrolled (step S47). In this case, the bit number represented by the pointer P.DIALQ is deleted, and data from the position indicated by pointer P.DIALQ+1 is shifted by one. As long as every call results in a connection, this loop will continue until a stop code is encountered in the shift register.

If NO in step S46, the pointer P.DIALQ is incremented by one (step S48), and the flow returns to step S43. In this case, the number which was busy remains in the shift register, but is skipped while the process cycles through steps S43 through S47 (or S48), calling the remaining destinations in the group.

If the bit number is equal to the stop code in step S44 and the pointer P.DIALQ is set to be "0" (step S49), all the destinations have been connected to the facsimile machine, thereby completing the multi-address call of one group. However, if the pointer P.DIALQ in step S49 is not "0", i.e., if one or more called destinations were busy when first called, the register R.REDIAL is decremented by one (step S50). The flow (assuming R.REDIAL is not yet zero) returns to step S42. The loop of steps S43 through S47 (or S48) is now performed again for each telephone number remaining in the shift register, that is, for each of the numbers that were previously busy. After all of those numbers have been re-called, any that are still busy on the second attempt, are called a third time, and so forth, until all destinations have been reached successfully ("YES" in step S46), or until the number of re-calls of each number that is still busy has reached the value set for R.REDIAL in step S41 (3, in this embodiment). That is, if the register R.DEDIAL is set to be "0" (step S51), the destinations left in the dial queue are destinations which were not ultimately connected to the facsimile apparatus. The multi-address call of one group is ended. If a bit of "1" is present in the register F.ASSIGN, the flow returns to step S3, and the above multi-address call processing is repeated. Thus, in the first mode, in which all destinations are together in a single group, all destinations are called before any recalls are made to busy numbers. In the second mode, in which plural groups of more than one destination are present, all the destinations in a given group are called, after which all busy destinations (if any) in that group are re-called, and only then are destinations in the next group called for the first time. In the third mode, in which each destination is a group in itself, any busy destination is re-called before any new destination is called. Thus, the process, or sequence, of re-calling is different in each of the three modes.

FIG. 5 is a view showing an operation represented by the flow chart of FIG. 3-3.

Figure 61:
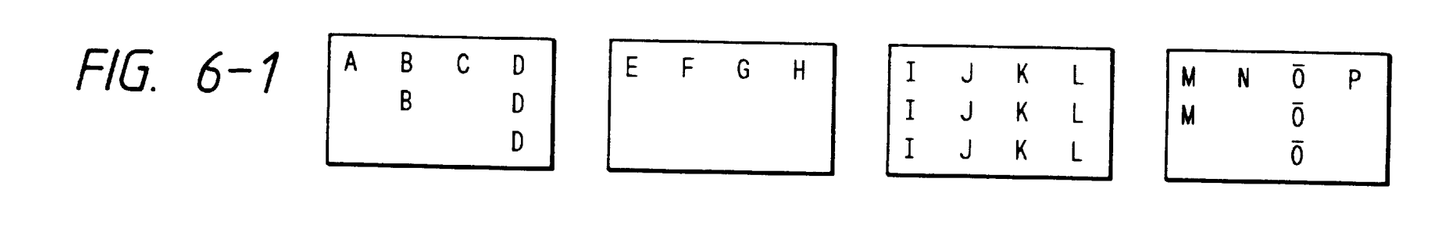
Figure 62:
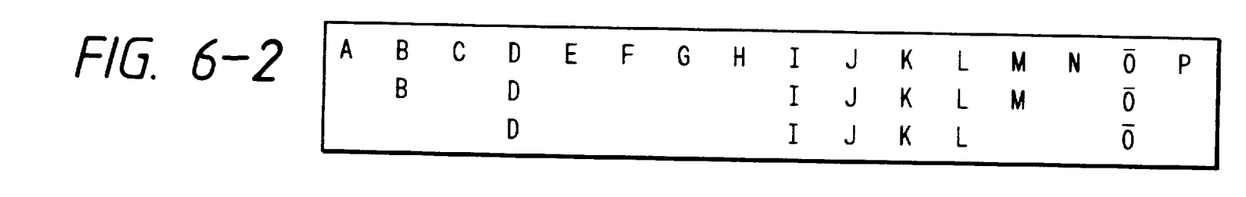
Figure 63:
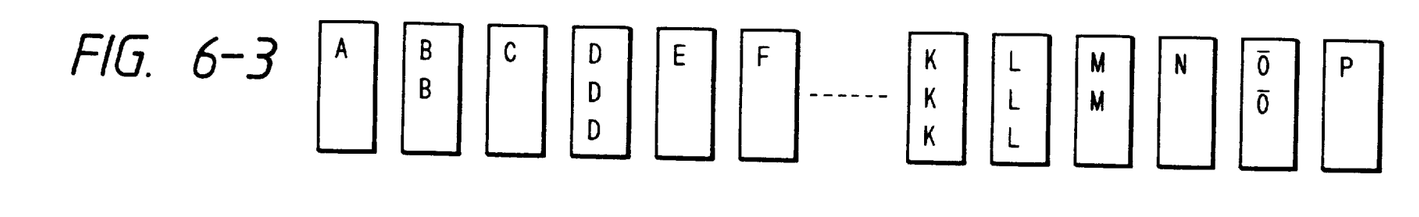

FIG. 6 shows multi-address call patterns (1), (2), and (3) when the number of group elements is changed.

Sixteen multi-address call destinations in the patterns (1), (2), and (3) in FIG. 6 are assigned to the "A" to "P" keys, respectively, and the same connected and disconnected destinations are given in the patterns (1), (2), and (3).

The pattern (1) in FIG. 6 is obtained when the number of group elements is 4. In this case, since the number of group elements is neither 1 nor the same number as that of multi-address call destinations, the group multi-address call is performed.

The pattern (2) in FIG. 6 is obtained when the number of group elements is 16. In this case, the number of group elements is the same as that of multi-address call destinations. Therefore, the mode is set to be the all-destination multi-address call mode.

The pattern (3) in FIG. 6 is obtained when the number of group element is 1. In this case, the mode is set to be the one-destination multi-address call mode.

The number of group elements can be changed by a user's operation or registration by a serviceman.

Parameters of the next destination dialing interval within the same group, a dialing interval between the groups, the number of redialing operations, and a redialing interval can be updated by a user's operation or by registration by a serviceman. Therefore, complicated multi-address call control can be facilitated.

The above embodiment exemplifies a facsimile apparatus. However, the present invention is also applicable to apparatuses having a multi-address call function as in a document communication apparatus such as a teletex.

The number of one-touch dial keys is not limited to 16 but can be 17 or more, or 15 or less.

The present invention is not limited to the particular embodiment described above. Various changes and modifications may be made within the spirit and scope of the invention.

What is claimed is:

1. An image communication apparatus comprising:
   manual designating means for designating a plurality of destinations to which image data is to be transmitted;
   multi-address call means, having a plurality of multi-address call modes including at least a first multi-address call mode and a second multi-address call mode, for transmitting image data to the plurality of destinations designated by said manual designating means, wherein said first multi-address call mode and said second multi-address call mode are different from each other in a process for re-dialing a destination which is busy, wherein said first multi-address call mode is a mode for sequentially transmitting the image data to all the destinations, and said second multi-address call mode is a mode in which all the destinations are divided into at least two groups, each group having a plurality of destinations, and in which an operator uses said manual designating means to input information to define which of the destinations are in which group and the image data is then sequentially transmitted to the destinations in one group and thereafter the image data is sequentially transmitted to the destinations in the other group;
   means for setting a proper multi-address call mode of said multi-address call means; and
   control means for controlling multi-address transmission in accordance with the proper multi-address call mode set by said setting means and in accordance with the respective, different processes for re-dialing corresponding to the set mode.

2. An apparatus according to claim 1, wherein said setting means is manual setting means.

3. An apparatus according to claim 1, wherein said multi-address call means has a third multi-address call mode.

4. An apparatus according to claim 3, wherein the third multi-address call mode is a mode for transmitting the image data and terminating transmission for every destination.

5. An apparatus according to claim 1, wherein said setting means sets a multi-address call mode in accordance with the number of destinations belonging to one group.

6. An image communication apparatus comprising:
   manual designating means for designating multi-address call destinations to which image data is to be transmitted;
   multi-address call means for transmitting image data to the multi-address call destinations designated by said manual designating means; and
   control means for dividing all the multi-address call destinations into a plurality of groups, each group having a plurality of the multi-address call destinations, and for sequentially transmitting image data to all the multi-address call destinations in a first group and then sequentially transmitting image data to all the multi-address call destinations in a second group, wherein redialing when a multi-address call destination is busy is performed for the first group before the destinations in the second group are called.

7. An apparatus according to claim 6, further comprising means for setting the number of destinations of one group, and wherein said control means performs group division in accordance with the number of destinations set by said setting means.

8. An apparatus according to claim 6, wherein said control means is a control unit operated in accordance with a control program.

9. An apparatus according to claim 8, wherein said control means has a memory area for group division.

10. An apparatus according to claim 7, wherein said setting means is manual setting means.

11. A method of performing a multi-address call in image communication, comprising the steps of:

manually designating multi-address call destinations to which image data is to be transmitted;

dividing the multi-address call destinations into a predetermined number of groups, each group having a plurality of the multi-address call destinations; and sequentially transmitting image data to all the multi-address call destinations in a first group and then sequentially transmitting image data to all the multi-address call destinations in a second group, wherein redialing when a multi-address call destination is busy is performed for the first croup before the destinations in the second group are called.

12. A method according to claim 11, wherein the step of dividing the multi-address call destinations into the predetermined number of groups comprises the step of group-dividing the multi-address call destinations in accordance with a set number of destinations of ane group.

13. A method according to claim 12, wherein the step of sequentially transmitting the image data in units of divided groups comprises the step of transmitting the image data in an all-destination multi-address call mode when the number of destinations of one group is the same as the number of multi-address call destinations, and transmitting the image data in a one-destination multi-address call mode when the number of destinations of one group is one.

14. A method according to claim 11, further comprising the step of setting the number of destinations of a group to be variable.

* * * * *

UNITED STATES PATENT AND TRADEMARK OFFICE
CERTIFICATE OF CORRECTION

PATENT NO. : 5,852,500

DATED : December 22, 1998

INVENTOR(S) : MOTOAKI YOSHINO

It is certified that error appears in the above-identified patent and that said Letters Patent is hereby corrected as shown below:

COLUMN 5

Line 10, "R.DEDIAL" should read --R.REDIAL--.

COLUMN 7

Line 17, "croup" should read --group--.

COLUMN 8

Line 5, "ane" should read --one--.

Signed and Sealed this

Sixteenth Day of November, 1999

*Attest:*

Q. TODD DICKINSON

*Attesting Officer*     *Acting Commissioner of Patents and Trademarks*